Nov. 10, 1936.                H. H. KEMPF                2,060,771
              MARGINAL WARNING SIGNAL FOR AUTOMOBILES
                  Filed March 7, 1934        2 Sheets-Sheet 1
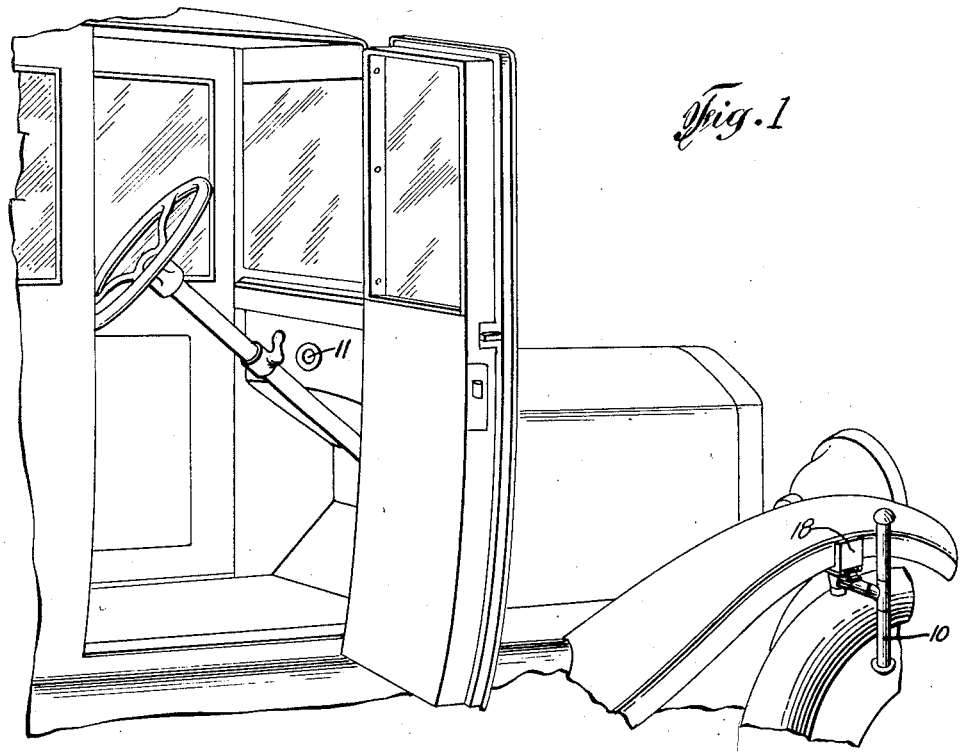
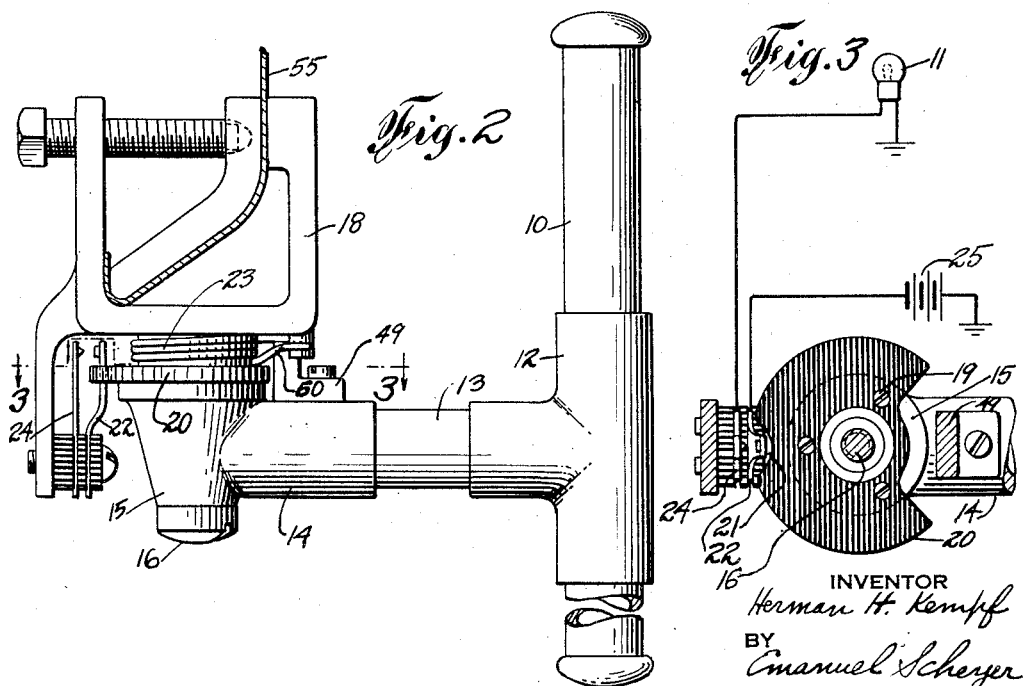
INVENTOR
Herman H. Kempf
BY
Emanuel Scherzer
ATTORNEY

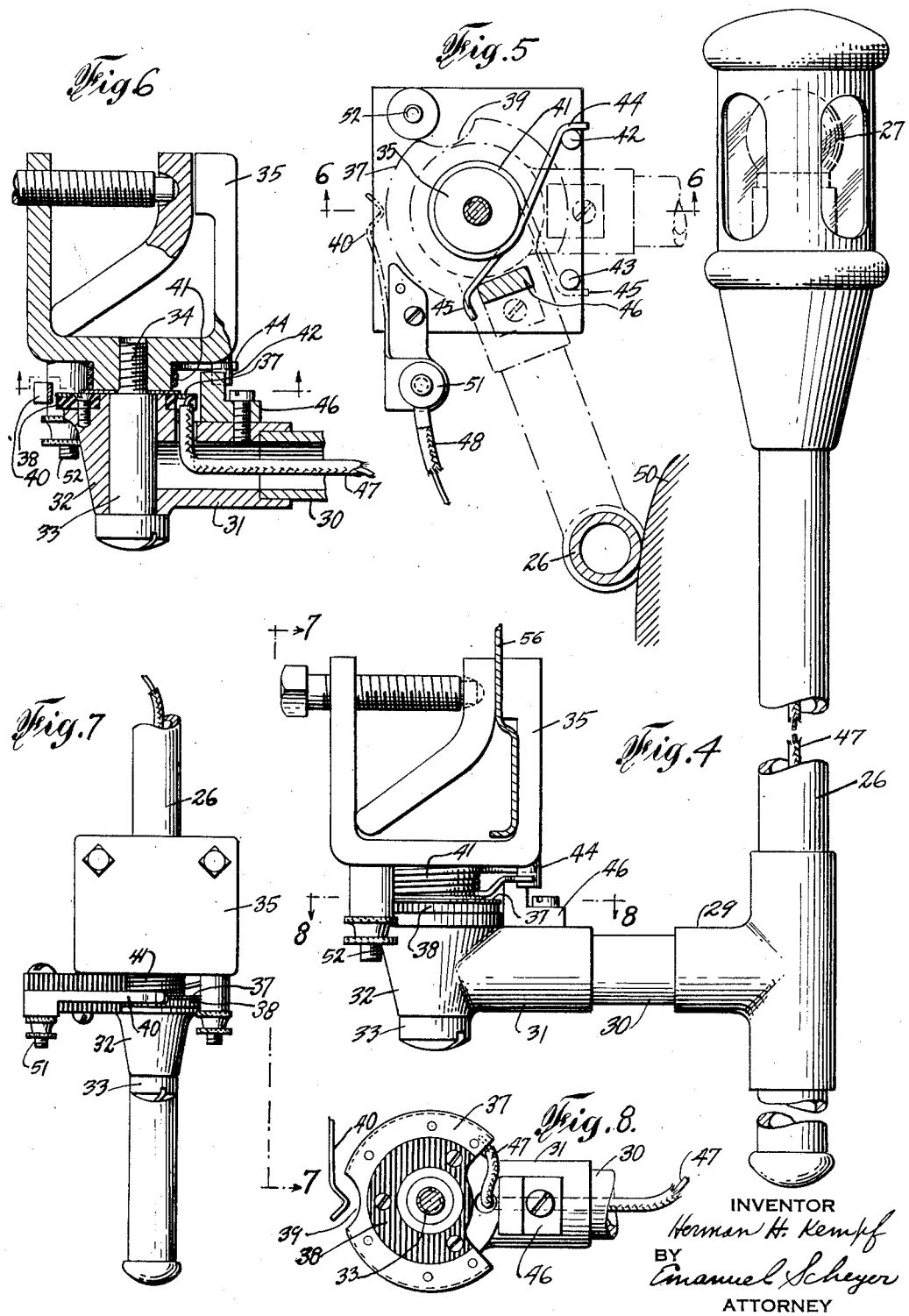

Patented Nov. 10, 1936

2,060,771

UNITED STATES PATENT OFFICE 2,060,771

MARGINAL WARNING SIGNAL FOR AUTOMOBILES

Herman H. Kempf, New York, N. Y.

Application March 7, 1934, Serial No. 714,370

10 Claims. (Cl. 177—311)

My invention relates to a marginal warning signal for automobiles. A feeling device is fastened to the automobile, preferably to a mudguard and projects outwardly a predetermined distance or margin therefrom. When the automobile comes near enough for the feeler to contact with an object, such as the side of a doorway, fence, tree, post or the bumper, mud guard or other part of another automobile, said feeler effects the operation of an indicating device such as a red lamp, the automobile horn, or a buzzer which may be located on the dash board, warning the driver that his car is close to the object. In another type the lamp is carried directly by the feeler. In my preferred form, upon contact with an object, the feeler is swung from its normal position closing a switch thereby.

Other objects and advantages will become apparent upon further study of the specification and drawings, in which:—

Fig. 1 is a partial perspective view of an automobile showing my device attached to the mud guard with an indicating lamp on the dash board.

Fig. 2 is an elevation of the device shown clamped to the edge portion of a mud guard of one type of cross section, with a portion of the feeler broken away.

Fig. 3 is a plan section along the broken line 3—3 of Fig. 3 with a wiring diagram added and a portion of the supporting arm and feeler omitted.

Fig. 4 is an elevation of a modified form of the device in which the indicating signal is carried by the feeler, a mud guard of different cross section than in Fig. 2 being shown, and a portion of the feeler being broken away.

Fig. 5 is a sectional plan looking upward taken just below the clamp and is along the line 5—5 of Fig. 6. Portions below the plan are shown in dot and dash lines. In this figure the feeler is deflected by contact with an object. A portion of the feeler in normal position is also shown.

Fig. 6 is a vertical section of the device of the type shown in Fig. 4, taken along the line 6—6 of Fig. 5, a portion of the feeler being broken away. The clamp is shown without attachment to a mud guard.

Fig. 7 is a rear elevation to a smaller scale, taken along the line 7—7 of Fig. 4 the upper portion of the feeler being broken away, and Fig. 8 is a partial sectional plan taken along the line 8—8 of Fig. 4, the binding posts being omitted.

In Figs. 1, 2 and 3 is illustrated the form of my device in which the feeler 10 operates a signal lamp 11 on the dash board. Instead of using a signal lamp, other forms of indicating devices, such as a buzzer may be substituted instead. Feeler 10 is connected by means of a three-way coupling 12, with tube 13. The other end of tube 13 is connected, by means of coupling 14, with conical sleeve 15. Parts 12, 13 and 14 form a supporting arm for feeler 10. Sleeve 15 is rotatably mounted on screw 16, which has an end portion of reduced diameter, not seen, which is threaded and screwed into bracket 18. This will be seen in greater detail in Fig. 6. Screw 16 thus forms a pivot pin about which feeler 10 may swing. Fixed to the upper end of sleeve 15, by means of screws 19, is a plate 20 of insulating material. Spring 23 normally holds feeler 10 and its supporting arm in the position shown in Figs. 1, 2 and 3 in which position plate 20 has its notch 21 so located that spring contact 22 nests in it. When feeler 10 is rotated against the tension of spring 23 by coming into contact with an object, plate 20 rotates with it, causing spring contact 22 to ride out of notch 21, into contact with spring contact 24. The action of spring 23 will be more fully explained hereafter in connection with Fig. 5.

When contact is made between spring contacts 22 and 24, a circuit is closed as follows (Fig. 3). The current flows from one terminal of the battery 25 to ground, from ground to one terminal of lamp 11, from the other terminal of lamp 11 to contact 24, to contact 22, back to battery 25.

In the modified form of my invention shown in Figs. 4 to 8 inclusive, the feeler 26 carries the indicating device, lamp 27, directly upon it, instead of having the indicating device on the dash board. The feeler 26 is a tube within which is located a wire 47 connected at its upper end with one terminal (not shown) of lamp socket 28. The other terminal of said socket, as is well known in the art, is grounded to the tube comprising feeler 26. Said tube is connected by 3 way coupling 29 to a short length of tubing 30, which in turn is connected to coupling 31 carried by conical sleeve 32. Sleeve 32 is rotatably mounted on screw 33 which has an end portion 34 of reduced diameter which is threaded and screwed into bracket 35 until the shoulder of said screw rests hard against the bottom of washer 36 set on the bottom of said bracket. Screw 33 thus forms a pivot pin about which feeler 26 may swing.

Metal contact disc 37 is insulatively mounted on sleeve 32 by the interposition of insulating plate 36. Wire 47 is connected to contact disc 37, which latter is provided with a notch 39 in which spring contact 40 nests without contact with said disc, when the feeler is in normal position. Spring 41 maintains feeler 26 in normal position, as long as said feeler is not swung around by coming into contact with an object.

Projecting from the bottom of bracket 35 are two pins 42 and 43. When feeler 26 is in normal position, its supporting arm being shown in dot and dash for such position in Fig. 5, the end 44 of spring 41 is in contact with pin 42, while the end 45, shown in dot and dash in Fig. 5, is in contact with pin 43. Coupling 31 has fixedly mounted upon it angle lug 46. When feeler 26 with its supporting arm is swung by an object 50 from its normal position, shown extending to the right in Fig. 5, to the position shown in contact with object 50, angle lug 46, engages spring end 45 and forces it against the tension of spring 41 to the position shown in solid lines. At the same time contact disc 37 is rotated, causing spring contact 40 to ride out of notch 39 into contact with the periphery of contact disc 37. This closes a circuit from one terminal of lamp 27, through wire 47, to contact disc 37, to spring contact 40, to binding post 51 to wire 48, to the battery (not shown), through the battery to ground, and from ground by a wire (not shown) to binding post 52 which is grounded to the feeler, to the terminal of lamp 27 grounded on the feeler, thereby completing the circuit.

When feeler 26 is swung in the opposite direction from that shown in contact with object 50 in Fig. 5, angle lug 46 engages spring end 44. When feeler 26 is released, it returns to normal position, and spring ends 44 and 45 contact with pins 42 and 43 respectively.

The mounting of spring 23, Fig. 2, is similar to that described for spring 41, Fig. 5, angle lug 49 engaging the spring ends, one of which is shown at 60, when feeler 19 is swung about in a manner similar to that of angle lug 46.

Feeler 19, Fig. 2 may be modified also to carry a lamp or other highly visible part at its top. Where a lamp is carried it may be connected by a wire inside the feeler in an independent circuit with the battery, so that the lamp may be lit constantly. The highly visible part or lamp serves as a guide with the margin noted hereinbefore, to the position of the vehicle even when the feeler is out of contact with an object. When the feeler comes into contact with an object, the motion of the highly visible object or lamp will indicate to the driver such contact even if the indicating device is omitted.

I claim:—

1. A marginal warning signal for automobiles comprising an upstanding feeler, a horizontally extending arm attached at its outer end to said feeler, a pivotal mounting for the inner end of said arm, means for fastening said mounting to the mud guard of an automobile, and spring means, associated with said mounting normally holding said feeler so that a line drawn from the feeler to said pivotal axis is substantially perpendicular to the longitudinal axis of the automobile, said feeler when in normal position being spaced a distance or margin beyond the outside edge of a mud guard of the automobile, said spring means resisting turning of the feeler in either direction about said pivotal axis from its normal position.

2. A marginal warning signal for automobiles, comprising a feeler having an upstanding portion and a portion extending generally laterally inward from said upstanding portion, a mounting pivotally supporting said laterally extending portion near its inner end, means for fastening said mounting upon a mud guard of an automobile, spring means associated with said mounting normally holding the upstanding portion of the feeler a space or margin beyond the outside edge of said mud guard, said spring means resisting turning of the feeler in either direction about its pivotal axis from normal position, an electrically operated indicating device, and a switch associated with said mounting actuated by the feeler when turned from normal position to effect the operation of the indicating device.

3. A marginal warning signal for automobiles, comprising a feeler, a lateral extension provided on said feeler, a pivotal support for said extension, means for fastening said support upon a mud guard of an automobile, spring means associated with said extension normally holding the feeler a given space or margin beyond the outside edge of the mud guard, said spring means resisting turning from normal position of the feeler about the pivotal axis of the support, an electrically operated indicating device fixedly mounted upon the automobile, and switch means comprising an insulative member mounted on said extension and moving therewith, and relatively movable contacts normally out of contact with each other, mounted on said support in circuit with the indicating device, said member causing contact between said contacts when the feeler is moved from its normal position, operating the indicating device thereby.

4. A marginal warning signal for automobiles, comprising a feeler, a lateral extension provided on said feeler, a pivotal support for said extension, means for fastening said support upon a mud guard of an automobile, spring means associated with said extension normally holding the feeler a given space or margin beyond the outside edge of the mud guard, said spring means resisting turning from normal position of the feeler about the pivotal axis of the support, an electrically operated indicating device mounted upon the feeler, and switch means comprising a contact mounted upon said extension and moving therewith and another contact mounted upon said support, said contacts being in circuit with the indicating device and out of contact with each other when the feeler is in normal position, the contact between said contacts being effected when the feeler is moved out of normal position, operating the indicating device thereby.

5. An indicating device for the mud guard of automobiles comprising an indicating arm, a lateral extension of said arm for holding said arm a substantial space away from the outside edge of the mud guard and means for fastening the inner end of the extension to said edge of the mud guard, comprising a substantially channel shaped member having its outer leg coming against the outside of the mud guard, its inner leg spaced a substantial distance away from said outside leg, and its web coming below the outside edge of the mud guard, a spacer inside said member extending substantially diagonally across said member, the lower end of said spacer pressing against the corner formed by the junction of the inside leg and web of said member and the upper end of said spacer contacting with the inside of the mudguard substantially opposite where said outer leg comes against the outside of the mud guard, and a screw threaded through said inner leg and pressing the upper end of the spacer against the inside of the mud guard.

6. A marginal warning signal for automobiles, comprising a feeler, a lateral extension provided on said feeler, a mounting for said extension having a pivot pin, means for fastening said mounting upon a mud guard of an automobile holding said pin with its longitudinal axis in substantially vertical position, said extension being loosely mounted upon said pin for rotation about it, a spiral spring mounted over said pin with the two ends of the spiral extending outwardly therefrom, and held in a predetermined normal position, and means upon said extension coming between said ends, said extension being normally held thereby with the feeler a given space or margin beyond the outside edge of the mud guard, said means being moved against the spring pressure of one or the other of said ends when said feeler is forced out of its normal position.

7. A marginal warning signal for automobiles comprising an upstanding indicating member, a pivotal mounting for said member, the pivotal axis of said mounting being substantially vertical, and means for fastening said mounting upon a mud guard of an automobile, said mounting yieldably and resiliently holding the feeler normally a substantial distance or margin beyond the outside edge of said mud guard, opposite said edge.

8. A marginal warning signal for automobiles, comprising a feeler, a pivotal mounting for said feeler, means for fastening said mounting upon a mud guard of an automobile, spring means associated with said mounting normally holding the feeler a space or margin beyond the outside edge of said mud guard, said spring means resisting turning of the feeler in either direction about its pivotal axis from normal position, an electric lamp mounted upon the upper part of the feeler, and a switch associated with said mounting actuated by the feeler when turned from normal position to effect the lighting of the lamp.

9. A marginal warning signal for automobiles comprising a feeler having an upstanding portion and a portion extending generally laterally inward from said upstanding portion, a mounting pivotally supporting said laterally extending portion near its inner end, the pivotal axis of said mounting being substantially vertical, means for fastening said mounting to the automobile, and spring means associated with said mounting, normally holding said feeler so that a line drawn from the upstanding portion of said feeler to said pivotal axis is substantially perpendicular to the longitudinal axis of the automobile, said feeler, when in normal position being spaced a substantial distance or margin beyond the side of the automobile, said spring means resisting turning of the feeler about said pivotal axis from its normal position.

10. A marginal warning signal for automobiles comprising a feeler, means for pivotally mounting said feeler upon an automobile, spring means cooperating with the mounting means for normally holding the feeler a substantial distance or margin beyond the side of the automobile substantially opposite the side of the automobile, an electric lamp mounted on the feeler, and a switch associated with said mounting actuated by the feeler when turned from normal position to effect the lighting of the lamp.

HERMAN H. KEMPF.